United States Patent
Jiang et al.

(10) Patent No.: US 12,416,904 B2
(45) Date of Patent: Sep. 16, 2025

(54) METHOD FOR GUARANTEEING RELIABILITY OF REAL-TIME SCRAMBLING AND MESSAGE TRANSMISSION BY TRAIN CONTROL CENTER SYSTEM

(71) Applicant: CASCO SIGNAL LTD., Shanghai (CN)

(72) Inventors: Hongjun Jiang, Shanghai (CN); Fei Lu, Shanghai (CN); Xiaoguang Li, Shanghai (CN); Xin Yao, Shanghai (CN); Wenhao Shi, Shanghai (CN); Lei Feng, Shanghai (CN); Cece Zhou, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 442 days.

(21) Appl. No.: 18/013,255

(22) PCT Filed: Nov. 4, 2021

(86) PCT No.: PCT/CN2021/128584
§ 371 (c)(1),
(2) Date: Dec. 28, 2022

(87) PCT Pub. No.: WO2022/134880
PCT Pub. Date: Jun. 30, 2022

(65) Prior Publication Data
US 2023/0185264 A1    Jun. 15, 2023

(30) Foreign Application Priority Data
Dec. 23, 2020   (CN) .......................... 202011540025.2

(51) Int. Cl.
*G05B 19/042*    (2006.01)
*H04L 9/00*    (2022.01)

(52) U.S. Cl.
CPC .......... *G05B 19/0423* (2013.01); *H04L 9/001* (2013.01); *H04L 2209/12* (2013.01)

(58) Field of Classification Search
CPC ............ G05B 19/0423; G05B 19/0425; H04L 2209/12; H04L 9/001; G06F 21/606; G06F 21/72; G06F 12/1408; H04K 1/04
See application file for complete search history.

(56) References Cited

U.S. PATENT DOCUMENTS 6,837,425 B2 *   1/2005   Gauthier .............. G06Q 20/327
                                                    705/14.27
6,958,709 B2 *   10/2005   Izbicki ................... G08G 1/123
                                                    701/533

(Continued)

OTHER PUBLICATIONS

"International Search Report (Form PCT/ISA/210) of PCT/CN2021/128584", mailed on Jan. 26, 2022, with English translation thereof, pp. 1-6.

*Primary Examiner* — Hosuk Song
(74) *Attorney, Agent, or Firm* — JCIPRNET

(57) ABSTRACT

The invention relates to a method for guaranteeing the reliability of real-time scrambling and message transmission by a train control center system. The method comprises the following steps: S1, starting the system for offline message loading and reading; S2, obtaining message data to be scrambled; S3, sending the message to be scrambled to a scrambling operation board for scrambling; S4, performing inverse decoding processing on an operation board; S5, performing comparison after decoding; and S6, outputting effective message data. Compared with the prior art, the invention has the advantages of being capable of guaranteeing the safety and reliability of message data.

9 Claims, 3 Drawing Sheets

(56) References Cited

U.S. PATENT DOCUMENTS

| | | | |
|---|---|---|---|
| 7,880,645 B2* | 2/2011 | Park | G08G 1/123 |
| | | | 340/994 |
| 8,081,760 B2* | 12/2011 | Glickman | H04L 51/00 |
| | | | 380/278 |
| 8,458,461 B2* | 6/2013 | Tardo | H04L 9/0637 |
| | | | 713/161 |
| 11,514,487 B1* | 11/2022 | Alwafai | G06Q 10/063 |
| 12,073,447 B1* | 8/2024 | Alwafai | G06Q 10/02 |
| 2021/0165916 A1* | 6/2021 | Abhyankar | H04L 9/0637 |

* cited by examiner

METHOD FOR GUARANTEEING RELIABILITY OF REAL-TIME SCRAMBLING AND MESSAGE TRANSMISSION BY TRAIN CONTROL CENTER SYSTEM

CROSS-REFERENCE TO RELATED APPLICATION

This application is a 371 of international application of PCT application serial no. PCT/CN2021/128584, filed on Nov. 4, 2021, which claims the priority benefit of China application no. 202011540025.2, filed on Dec. 23, 2020. The entirety of each of the above mentioned patent applications is hereby incorporated by reference herein and made a part of this specification.

BACKGROUND OF THE INVENTION

1. Technical Field

The invention relates to train signal control systems, in particular to a method for guaranteeing the reliability of real-time scrambling and message transmission by a train control center system.

2. Description of Related Art

A CTCS-2 train control system is widely used in China now, and the balise messaging function plays a vital role in train control and safe driving. As an input source of an active balise message, a train control center system must ensure the accuracy and reliability of the sent balise message.

The train control center needs to scramble the active balise message in real time. In the prior art, code bit information hopping and packet loss may occur during message scrambling and transmission. Therefore, how to prevent the above problems so as to ensure the correctness of scrambling has become a technical problem to be solved.

BRIEF SUMMARY OF THE INVENTION

In order to overcome the defects in the prior art, the invention provides a method for guaranteeing the reliability of real-time scrambling and message transmission by a train control center system.

The purpose of the invention can be realized by the following technical scheme.

According to one aspect of the invention, a method for guaranteeing the reliability of real-time scrambling and message transmission by a train control center system is provided, which comprises the following steps:
S1, starting the system for offline message loading and reading;
S2, obtaining message data to be scrambled;
S3, sending the message to be scrambled to a scrambling operation board for scrambling;
S4, performing inverse decoding processing on an operation board;
S5, performing comparison after decoding; and
S6, outputting effective message data.

As a preferred technical scheme, in the step S1, specifically,
the system is powered on to initialize and read offline template message data, and then store the same in a specified memory area.

As a preferred technical scheme, in the step S2, specifically,
a logic operation board of a train control center selects messages to be scrambled according to external input conditions, and stores the same in a specified memory area.

As a preferred technical scheme, the external input conditions include speed limit initialization state, route information and temporary speed limit information.

As a preferred technical scheme, in the step S3, specifically,
after the logical operation board of the train control center completes message selection, the messages to be scrambled are sent to the scrambling operation board for scrambling, and after the scrambling operation board performs scrambling, scrambled message data are sent back to the logical operation board for inverse decoding operation.

As a preferred technical scheme, in the step S4, specifically,
after receiving scrambled messages sent by the scrambling operation board, the logic operation board of the train control center performs inverse decoding on the scrambled messages, and then stores the same in an inverse decoding memory area.

As a preferred technical scheme, in the step S5, specifically,
the message data subjected to inverse decoding are compared with the originally selected message data, if they are consistent, it means that scrambling is correct and the scrambled messages are valid, and otherwise, the scrambled messages are invalid.

As a preferred technical scheme, in the step S6, specifically,
the train control center sends the scrambled messages to a balise only when the messages subjected to inverse decoding are consistent with the originally selected messages, and otherwise, the message data are directed to a safe side for processing instead of being sent to the balise.

As a preferred technical scheme, the operation board scrambling and the operation board inverse decoding are respectively performed on different CPUs.

As a preferred technical scheme, the logic operation board is a 2-out-of-2 system, dual-CPU synchronous inverse decoding is performed, and 2-out-of-2 comparison is performed for consistency verification.

Compared with the prior art, the invention has the following advantages.

(1) According to the invention, the scrambled messages need to be subjected to inverse decoding, and then sent to the balise after being compared with the original messages to be scrambled; and otherwise, the messages are directed to the safe side for processing, so as to ensure the correctness of scrambling and prevent code bit information hopping and packet loss during message scrambling and transmission.

(2) In the invention, the scrambling function and the inverse decoding function are respectively performed on different CPUs, so that the difference between the scrambling algorithm and the inverse decoding algorithm can be ensured and a common mode can be avoided.

(3) The invention can ensure that message data sent by the train control center system are safe and reliable, and the inverse decoding process is also a system self-checking process.

(4) An inverse decoding processing module of the invention has high independence and clear modularity, which facilitates software maintenance and transplantation.

(5) Inverse decoding of the invention is performed on the logic operation board, which is a 2-out-of-2 system, dual-CPU synchronous inverse decoding is performed, and 2-out-of-2 comparison is performed for consistency verification.

DETAILED DESCRIPTION OF THE INVENTION

Figure 1:
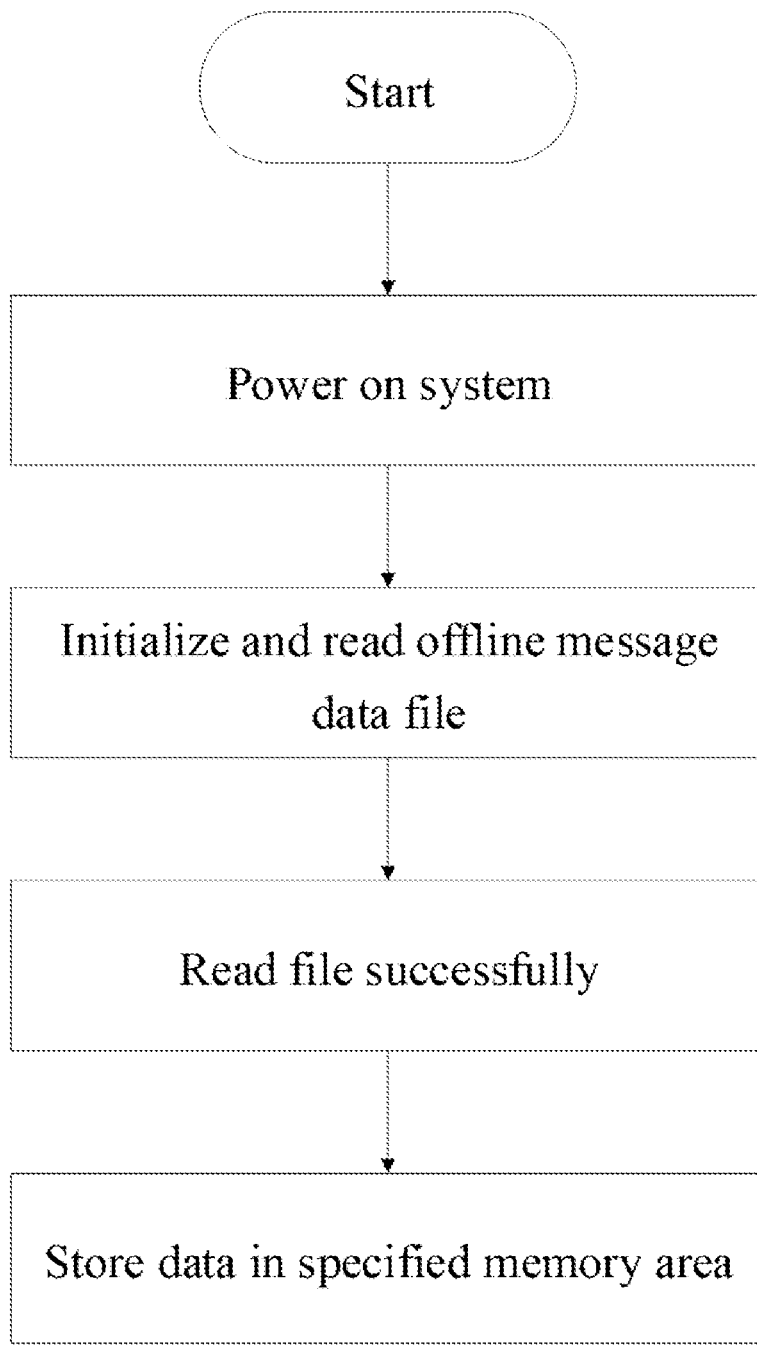
FIG. 1 is a flowchart of powering on a system and loading offline message data.

Hereinafter, the technical scheme in the embodiments of the invention will be described clearly and completely with reference to the drawings in the embodiments of the invention. Obviously, the described embodiments are only part of the embodiments of the invention, not all of the embodiments. Based on the embodiments of the invention, all other embodiments obtained by those of ordinary skill in the art without creative labor are within the scope of the invention.

A train control center needs to scramble an active balise message in real time to ensure the correctness of scrambling and prevent code bit information hopping and packet loss during message scrambling and transmission. Scrambled messages need to be subjected to inverse decoding, and then sent to a balise after being compared with original messages to be scrambled; and otherwise, the messages are directed to a safe side for processing.

The invention discloses a method for guaranteeing the reliability of real-time scrambling and message transmission by a train control center system, which specifically comprises the following steps:

S1, starting the system for offline message loading and reading;

wherein the system is powered on to initialize and read offline template message data, and then store the same in a specified memory area;

S2, obtaining message data to be scrambled;

wherein a train control center performs inputting according to external input conditions including speed limit initialization state, route information and temporary speed limit information, and a logic operation board of the train control center selects messages to be scrambled, and stores the same in a specified memory area;

S3, sending the message to be scrambled to a scrambling operation board for scrambling;

wherein after the logical operation board of the train control center completes message selection, considering that the time consumed by scrambling will affect the timing of the operation board, the messages to be scrambled are sent to the scrambling operation board for scrambling, and after the scrambling operation board performs scrambling, scrambled message data are sent back to the logical operation board for inverse decoding operation;

S4, performing inverse decoding processing on an operation board;

wherein after receiving scrambled messages sent by the scrambling operation board, the logic operation board of the train control center performs inverse decoding on the scrambled messages, and then stores the same in an inverse decoding memory area;

S5, performing comparison after decoding;

wherein the message data subjected to inverse decoding are compared with the originally selected message data, if they are consistent, it means that scrambling is correct and the scrambled messages are valid, and otherwise, the scrambled messages are invalid; and S6, outputting effective message data;

wherein in order to ensure that scrambled messages sent by the train control center are valid messages, the train control center sends the scrambled messages to a balise only when the messages subjected to inverse decoding are consistent with the originally selected messages, and otherwise, the message data are directed to a safe side for processing instead of being sent to the balise.

SPECIFIC EMBODIMENTS

Figure 2:
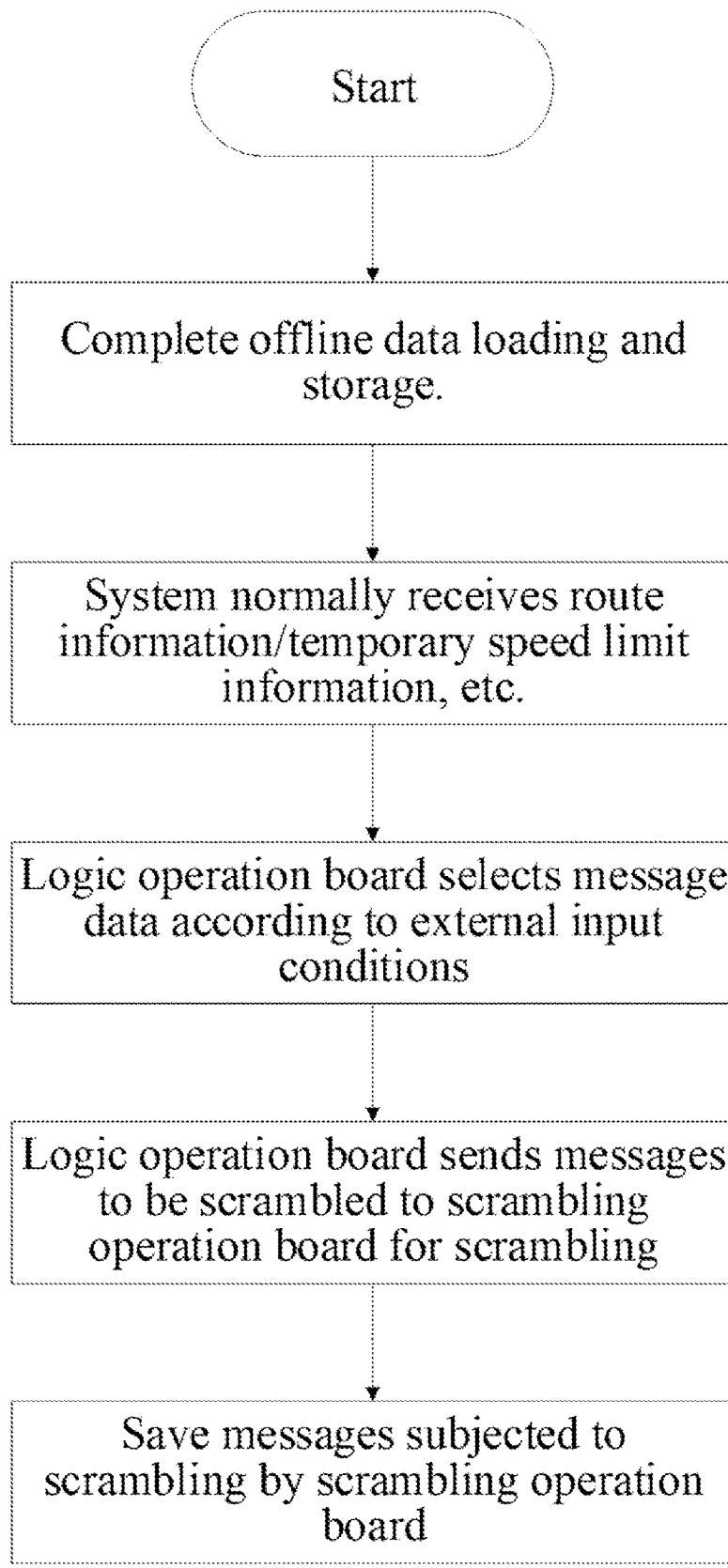
FIG. 2 is a flowchart of processing and sending message data.
Figure 3:
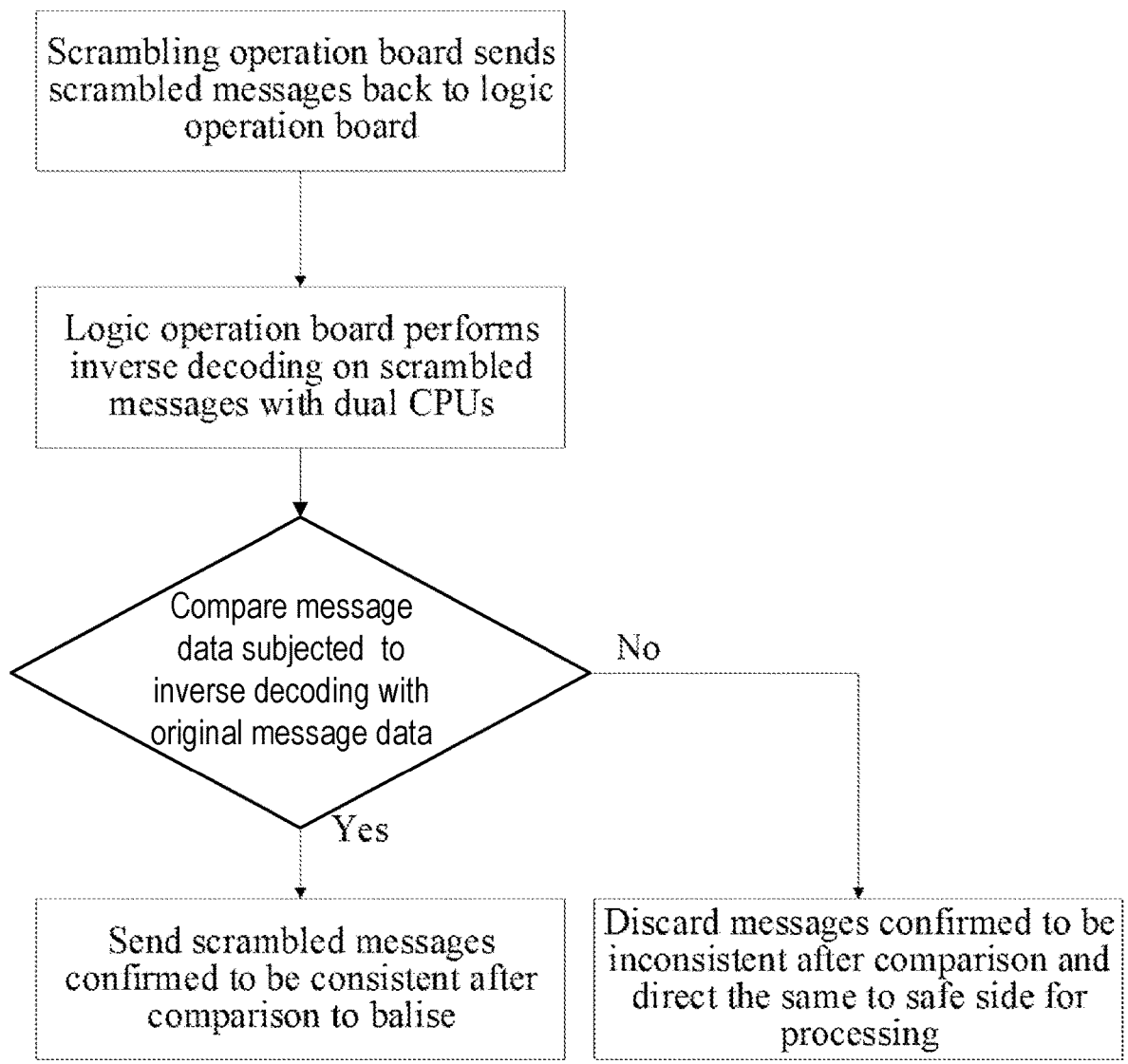
FIG. 3 is a flowchart of inverse decoding and comparison of message data.

In combination with FIG. 1 which shows the process of powering on a system and loading offline message data, FIG. 2 which shows scrambling message data, and FIG. 3 which shows inverse decoding of message data, the following steps are implemented:

(1) a system is powered on and started to initialize and load offline message data;

(2) after finishing initialization and offline data loading, the data are stored in a specified memory area;

(3) the system runs normally, and external interface communication is normal;

external input information such as route information and temporary speed limit commands can be normally received;

(4) according to external input conditions, the system selects messages and saves the same in a specified memory area of a logic operation board;

(5) the logic operation board transmits the message data to be scrambled to a scrambling operation board, and the messages are scrambled on the scrambling operation board, and then saved;

(6) the scrambling operation board sends the scrambled messages back to the logic operation board, and as a 2-out-of-2 system, the logic operation board performs inverse decoding on the messages with dual CPUs;

(7) after the logic operation board finishes inverse decoding, the obtained messages are compared with the messages selected in step 4 to ensure consistency on both CPUs, if they are consistent, it is considered that scrambling is successful, and otherwise, it is determined that scrambling fails; and (8) the system sends messages considered to be successfully scrambled in step 7 to a balise, and message data considered to be unsuccessfully scrambled will not be sent to the balise, and will be directed to a safe side for processing.

The technical scheme has been applied to a train control center system to ensure the safety and reliability of message data.

The above are only specific embodiments of the invention, but the protection scope of the invention is not limited thereto. Any person familiar with the technical field can easily think of various equivalent modifications or substitutions within the technical scope disclosed by the invention, and these modifications or substitutions should fall within the protection scope of the invention. Therefore, the protection scope of the invention shall be subject to the protection scope of the claims.

What is claimed is:

1. A method for guaranteeing a reliability of real-time scrambling and message transmission by a train control center system, comprising the following steps:
   step S1, starting a system for offline message loading and reading;
   step S2, obtaining messages to be scrambled;
   step S3, sending the messages to be scrambled to a scrambling operation board for scrambling;
   step S4, performing an inverse decoding on an operation board;
   step S5, performing a comparison after the inverse decoding, further comprising:
      message data subjected to the inverse decoding are compared with originally selected message data, if the message data and the originally selected message data are consistent, it means that the scrambling is correct and scrambled messages are valid, and otherwise, the scrambled messages are invalid; and
   step S6, outputting effective message data.

2. The method for guaranteeing the reliability of real-time scrambling and message transmission by a train control center system according to claim 1, wherein in the step S1, the system is powered on to initialize and read offline template message data, and then store the same in a memory area.

3. The method for guaranteeing the reliability of real-time scrambling and message transmission by a train control center system according to claim 1, wherein in the step S2, a logic operation board of a train control center selects the messages to be scrambled according to input conditions, and stores the same in a memory area.

4. The method for guaranteeing the reliability of real-time scrambling and message transmission by a train control center system according to claim 3, wherein the external input conditions include speed limit initialization state, route information and temporary speed limit information.

5. The method for guaranteeing the reliability of real-time scrambling and message transmission by a train control center system according to claim 1, wherein in the step S3, after the logical operation board of the train control center completes message selection, the messages to be scrambled are sent to the scrambling operation board for scrambling, and after the scrambling operation board performs scrambling, scrambled message data are sent back to the logical operation board for the inverse decoding.

6. The method for guaranteeing the reliability of real-time scrambling and message transmission by a train control center system according to claim 1, wherein in the step S4, after receiving the scrambled messages sent by the scrambling operation board, a logic operation board of the train control center performs the inverse decoding on the scrambled messages, and then stores the same in an inverse decoding memory area.

7. The method for guaranteeing the reliability of real-time scrambling and message transmission by a train control center system according to claim 6, wherein the logic operation board is a 2-out-of-2 system, dual-central processing unit synchronous inverse decoding is performed, and 2-out-of-2 comparison is performed for consistency verification.

8. The method for guaranteeing the reliability of real-time scrambling and message transmission by a train control center system according to claim 1, wherein in the step S6, the train control center sends the scrambled messages to a balise only when the messages subjected to the inverse decoding are consistent with originally selected messages, and otherwise, the scrambled messages are directed to a safe side for processing instead of being sent to the balise.

9. The method for guaranteeing the reliability of real-time scrambling and message transmission by a train control center system according to claim 1, wherein the scrambling and the inverse decoding are respectively performed on different central processing units.

* * * * *